(12) United States Patent
Miller

(10) Patent No.: US 8,474,387 B2
(45) Date of Patent: Jul. 2, 2013

(54) METHOD AND APPARATUS FOR INCINERATION OF COMBUSTIBLE WASTE

(75) Inventor: Steven Miller, Allentown, PA (US)

(73) Assignee: FLSmidth A/S (DK)

( * ) Notice: Subject to any disclaimer, the term of this patent is extended or adjusted under 35 U.S.C. 154(b) by 981 days.

(21) Appl. No.: 12/480,320

(22) Filed: Jun. 8, 2009

(65) Prior Publication Data

US 2010/0307390 A1   Dec. 9, 2010

(51) Int. Cl.
*F23G 5/16* (2006.01)
*F23G 5/20* (2006.01)
*F23G 7/00* (2006.01)
*C04B 11/036* (2006.01)
*C04B 7/44* (2006.01)

(52) U.S. Cl.
USPC ........... 110/246; 110/230; 110/257; 110/259; 110/315; 110/346; 106/745

(58) Field of Classification Search
USPC ................ 110/211, 212, 230, 246, 247, 255, 110/257, 259, 315, 316, 346; 106/745; 432/4, 432/15, 58, 106
See application file for complete search history.

(56) References Cited

U.S. PATENT DOCUMENTS

| | | | | |
|---|---|---|---|---|
| 6,161,490 A * | 12/2000 | Fujinami et al. | | 110/346 |
| 6,908,507 B2 * | 6/2005 | Lalande et al. | | 106/739 |
| 7,107,916 B2 * | 9/2006 | Bland et al. | | 110/346 |
| 7,377,773 B2 * | 5/2008 | Nolan et al. | | 110/246 |
| 2007/0234940 A1 * | 10/2007 | Thomsen | | 110/346 |

* cited by examiner

*Primary Examiner* — Kenneth Rinehart
*Assistant Examiner* — David J. Laux
(74) *Attorney, Agent, or Firm* — Daniel DeJoseph; Aaron M. Pile

(57) ABSTRACT

A method and apparatus for incinerating different types of combustible waste in a cement manufacturing process. Two combustion chambers for incinerating waste are arranged in series, with first combustion chamber being a down draft chamber in which there is a downward flow of combustion gas and waste fuel to a waste and gas outlet. The second chamber is adaptable to support waste on a supporting surface incorporated in the compartment, wherein the waste is transported through the compartment from a waste inlet to a waste outlet along a circular path.

18 Claims, 2 Drawing Sheets

METHOD AND APPARATUS FOR INCINERATION OF COMBUSTIBLE WASTE

BACKGROUND OF THE INVENTION

The present invention relates to a method for incineration of combustible waste that provides heat utilized in the manufacture of cement clinker where cement raw meal is preheated and calcined in a preheater system with a calciner, burned into clinker in a kiln and cooled in a subsequent clinker cooler. More specifically the invention involves the method of using two separate combustion chambers in series for maximizing the firing of alternative waste fuels, and for simultaneously firing a variety of waste fuels in a cement manufacturing process. The invention also relates to an apparatus for carrying out the method.

Examples of combustible waste suitable for firing in the present invention include whole and shredded tires, furniture, carpets, wood refuse, garden waste, kitchen and other household waste, paper sludge, paper, biomass, petcoke, anthracite, sewage sludge, liquid waste, bleaching earth, car parts, plastic, plastic bales and hazardous medical waste.

From EP-1200778, the contents of which are hereby incorporated by reference, is known a method as well as an apparatus for burning waste, i.e. alternative fuels, in a separate compartment in conjunction with a cement manufacturing plant subject to simultaneous supply of hot air coming preferably from the clinker cooler. The compartment is characterized by having a supporting surface for the waste and furthermore during incineration the waste is transported through the compartment to its outlet in a circular path. The compartment is particularly adaptable to incinerating a wide variety of waste as the retention time allotted to a particular waste material may be simply varied by changing the rotation rate of the waste. It is most suitably utilized for incinerating waste materials that require a relatively long material retention time, i.e. from at least about 5 minutes to about an hour or more, such as, for example, automobile tires, large wood waste, such as large pieces of telephone poles, municipal/household waste and automobile fluff.

In practice, this method and apparatus have proven to be particularly suitable for the incineration of larger waste, providing a significant heat contribution which has improved the total operating economics of the plant. However, the compartment characterized above is not necessarily adaptable for combusting different types of waste simultaneously, each of which may require varying amounts of material retention time.

Alternatively, it is known to utilize down draft combustion (also known at times as precalcining) chambers in cement operations to reduce fuel costs by burning alternative fuels. These combustion chambers are known for having utility for incinerating waste materials, such as liquid waste fuels and finely divided waste fuels that need only a relatively short retention time, i.e. from about 1 to about 10 seconds, such as liquid wastes and finely divided coal and petcoke. These combustion chambers, employed upstream from a calciner, pose problems if there is incomplete combustion, which can happen for example if they are used to combust larger sized waste fuels or a single alternative fuel source that has varying sized particles (for instance, shredded tires having widely varying sized particles) in that there will be a fall out of larger unburned particles into the kiln inlet. Such particles when burned at the kiln inlet will promote reduction conditions in the kiln which will negatively affect kiln performance in a cement making operation.

The present invention overcomes such disadvantages inherent in combustion chambers utilized in a cement making operation while providing the practitioner of the invention the option of simultaneously firing a variety of waste fuels or a waste fuel having varying particle sizes.

SUMMARY OF THE INVENTION

The invention comprises the novel combination of two dissimilar types of combustion chambers in a manner that overcomes the process disadvantages of each chamber. In particular, the invention comprises the use of a first, down draft, combustion chamber employing a very short material retention time upstream from and in series with a second combustion chamber suitable for combusting large solid alternate fuels. Said second chamber is characterized by (a) having a comparatively long material retention time; (b) having a supporting surface for the waste and (c) transporting the waste during incineration through the compartment to its outlet in a circular path. The combination of two completely different combustion chambers in series serves to thereby maximize the firing of alternate fuels in the cement making process. For example, liquid fuels, finely divided solid fuels or shredded tires, can be fired in the first combustion chamber while burning whole tires in the second combustion chamber.

DESCRIPTION OF THE DRAWINGS

The invention will now be described in further detail with reference to the accompanying drawings in which.

The drawings are not drawn to scale.

DETAILED DESCRIPTION OF THE INVENTION

Figure 1:
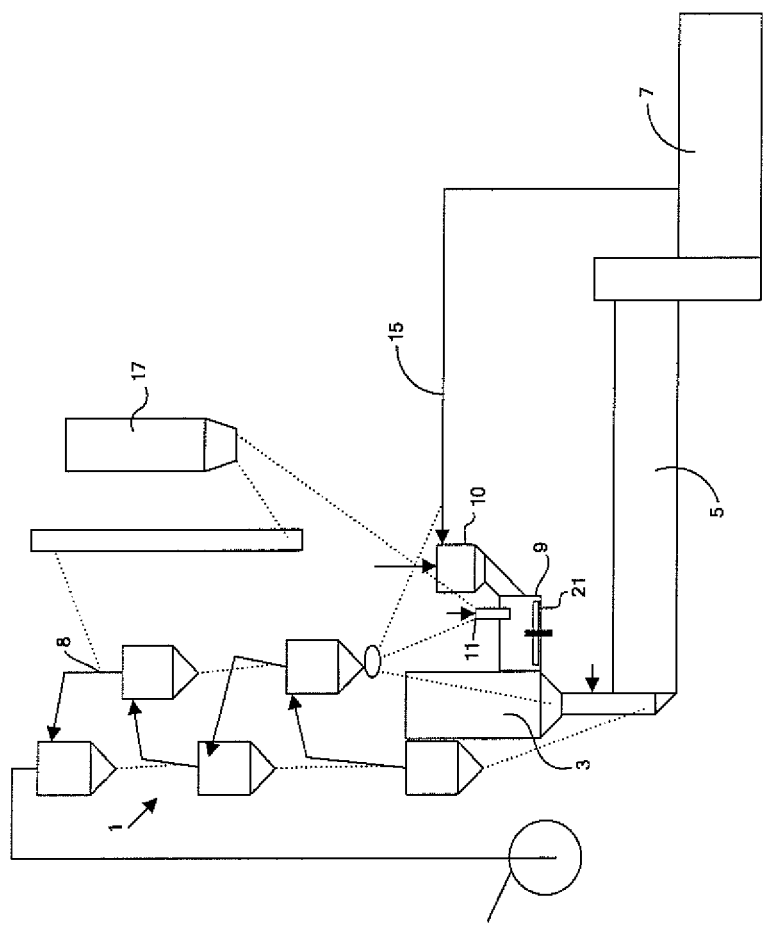
FIG. 1 shows an apparatus according to the invention.

In FIG. 1 is seen a plant for manufacturing cement clinker. The plant comprises a cyclone preheater 1 with calciner 3, a rotary kiln 5, a clinker cooler 7, a first combustion chamber 10 for incineration of waste which is introduced via an opening in the chamber and a second combustion chamber 9 for incineration of waste which is introduced via an opening in the chamber, with the second chamber being located between the calciner 3 and the first chamber 10. During operation the cement raw meal is directed from a raw meal store 17 to the raw meal inlet 8 of the preheater 1. From there the raw meal flows towards the rotary kiln 5 through the cyclones of the preheater 1 and the calciner 3 in counterflow to hot exhaust gases from the rotary kiln 5, thereby causing the raw meal to be heated and calcined. In the rotary kiln 5 the calcined raw meal is burned into cement clinker which is cooled in the subsequent clinker cooler 7 by means of atmospheric air. Some of the air thus heated is directed from the clinker cooler 7 via a duct 15 to the first chamber 10 and thereafter to second chamber 9. Heat generated in the first and second compartment is used in calciner 3 and thereafter through preheater 1.

The first compartment is comprised of one or more vertically situated vessels in which there is a downward flow of gas, raw meal and fuel. Fuel is preferably introduced from the top of the vessel. Solid waste fuel not consumed in the first compartment because of insufficient retention time will fall into the second compartment where it will be subject to a longer retention time and subsequent incineration.

Figure 2:
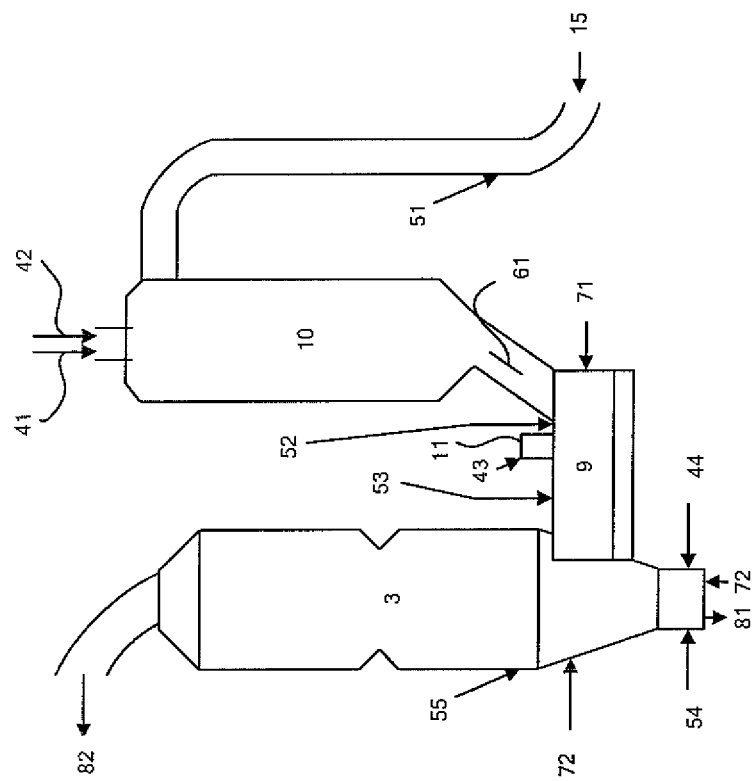
FIG. 2 shows a detail of a preferred embodiment of the invention.

With reference also to FIG. 2, fuel streams which are solid 41 and/or fuel which is liquid 42 are introduced into the first combustion chamber 10. Fuel streams 41 and 42 may be introduced through a chute or via injection through a burner, and may be introduced radially, tangentially, or axially. It is preferred that the main portion of the waste fuel enters first combustion chamber 10 axially. The solid fuel 41 that is introduced to the first combustion chamber 10 may vary in size over a large distribution, from a fine powder to large pieces up to about 250 mm in any direction. The solid fuel may also vary in density from very light material that may easily be entrained in a gas stream to very dense material which may not entrain in a gas stream except under very high velocity. The first combustion chamber 10 provides sufficient residence time, generally between about 1 to about 10 seconds, for the partial pyrolysis of larger particles of solid fuel and the pyrolysis and combustion of small particles of solid fuel and liquid fuel.

Air for combustion is provided via duct 15 to combustion chamber 10. The air may be introduced either simultaneously with or immediately after at least the main portion of the fuel is introduced into combustion chamber 10. The air may be introduced into the combustion chamber axially, tangentially, or radially. In the preferred arrangement, the air enters tangential to the combustion chamber. A portion of raw meal may be optionally introduced into the combustion chamber 10 and may be introduced directly into combustion chamber or into the air stream prior to introduction of the air stream to the combustion chamber, such as at location 51. The meal is introduced both for temperature control in the combustion chamber and for calcination prior to entering the kiln. The meal may be cold, but it is preferred that the raw meal be hot meal that has passed through at least one cyclone in the preheater tower, and it is most preferred that it come from the second or third cyclone stage from the bottom of the preheater.

The exit of the first combustion chamber 10 may be equipped with a device 61 for the mixing of the exhaust gas, raw meal, fuel ash, and solid fuel particles that have not fully combusted. This is preferred when the fuels in use are smaller in nature and a comparatively large amount of raw meal is fed to the first combustion chamber for temperature control.

Waste fuel may be simultaneously or sequentially added to the first and second combustion chambers. The chambers are arranged so that the waste material retention time in the second compartment is much longer than in the first, typically from at least about 90 times the retention time in the first combustion chamber to 1000 times the retention time combustion chamber in the first or more. By way of further example, if the waste retention time in the first combustion chamber 10 is three seconds and fifteen minutes in the second chamber 9, the waste material retention time in the second chamber will be 90 times the retention time in the first; if the waste retention time is only one second in the first and an hour in the second, the waste material retention time in the second chamber will be 3600 times the retention time in the first.

Typically, liquid waste fuels and smaller sized (e.g., tire chips) alternative fuels will be inserted in the first compartment, and larger waste (e.g. whole car tires) will be inserted in the second compartment. There fuels may be inserted simultaneously. Fuel with varying sized pieces is most advantageously inserted into the first compartment, wherein the smaller pieces will be consumed and the larger pieces will be subject to partial combustion and thereafter will fall to the second compartment for complete incineration.

As indicated, the first compartment is a vertically situated downdraft combustion chamber in which there is a downward flow of gas, raw meal and waste fuel. An example of a suitable vessel is FLSmidth's SLC-D calciner or FLSmidth's SLC-D-NOx™ calciner in which the fuel used in the calciner is injected axially at the top of the calciner. Preheated tertiary air from the clinker cooler and, optionally, preheated raw meal are introduced tangentially into the top of the calciner. When the raw meal is introduced tangentially as is provided, the meal will flow downwards along the side of the combustion chamber under the action of gravity while the preheated air envelopes the flame in the central part of the chamber so that it gradually mixes with the exhaust gas/fuel suspension. As a result, the amount of raw meal in the central part of the combustion zone of the combustion chamber will be quite small and this means that a high temperature, and thus a high degree of fuel burnout can be attained even when using fuels having a low content of volatile constituents. The tangential action causes the raw meal to travel in a spiral movement close to the cylinder wall, protecting the walls from the high temperature zone. The fuel is fired from the top in a suitable burner, which creates a well-mixed flame in the center of the calciner vessel.

Other examples of commercially available downdraft combustion chambers that may be employed in the invention are the Polysius Prepol-CC™ combustion chamber, Polysius Prepol-MSC-CC™ multi stage combustion chamber, RSP Minox™ combustion chamber, KHD Combustion Chamber and the KHD Pyroclon-R™ combustion chamber, to name just a few examples.

Unburned waste may fall from the first combustion chamber to the second combustion chamber 9, and/or waste may be introduced to the second chamber via the waste inlet 11 where it will fall onto a supporting surface 21 within the chamber 9, where the waste is heated and incinerated while it is simultaneously transported in the direction towards the outlet of the compartment along a circular path.

Exhaust gases from combustion chamber 10 enter chamber 9 for the incineration of large combustible fuel and provide oxygen and heat for the combustion of the fuel in the compartment 9. Fuel 43 which is predominantly large in size is introduced via the waste inlet 11 onto a supporting surface 21 in compartment 9, whereafter the fuel is ignited and incinerated while, at the same time, the fuel is transported to the outlet of the compartment. The speed at which the fuel is transported to the outlet of the compartment is varied to provide sufficient residence time for pyrolysis and combustion of the large fuel. Additional oxygen may be optionally provided directly to the compartment through an air or oxygen inlet 71 that may be at ambient temperature or may be preheated prior to entry. A portion of such air may come from conduit 15.

Large or agglomerated particles of fuel fed to combustion chamber 10 that do not fully combust in combustion chamber 9 may fall onto the supporting surface 21 of the compartment 9 where they undergo pyrolysis and combust. Smaller particles of fuel suspended in the exhaust gas from the combustion chamber 9 may continue to combust in the gas stream in the compartment. Raw meal 52 may be added to the compartment to assist in controlling the temperature in the compartment. The meal may be cold, but it is preferred that the raw meal be hot meal that has past through at least one cyclone in the preheater tower, and it is most preferred that it come from the second or third cyclone stage from the bottom of the preheater. Alternatively or additionally, raw meal may come from the calciner.

In the event that the process must be stopped, large particles of fuel may continue to combust on the supporting surface. In order to stop combustion in the event of a process shutdown, or to quench an overreactive combustion process on the supporting surface, it is preferred to provide a meal inlet 53 for providing material to the surface to extinguish combustion. The meal may be provided by the raw meal storage area 17 as depicted in FIG. 1, or may come from a separate storage location or a cyclone from the preheater.

The supporting surface 21 consists of a rotary disc which rotates about an axis and which constitutes the bottom of the compartment 9. For diverting combustion residues in the form of slag and any unburned waste through the outlet of the compartment and into the calciner 3, the compartment 9 utilizes a scraper mechanism.

The waste in compartment 9 is transported from a waste inlet in a circular path through to the outlet of the compartment 9 where the scraper mechanism will ensure that all material on the rotary disc is pushed over the edge and into the calciner, where the material is sorted so that small particles suspended in the exhaust gases are thrust upwards in the calciner whereas any large particles are directed downwards to the kiln or are disintegrated.

The second combustion chamber may also comprise a gas-tight, stationary partition wall which is located on the rotational stretch between the outlet of the compartment and the inlet. The function of the partition wall is to ensure that the hot exhaust gases from the kiln travel in counterflow over the waste along a path which is roughly the same. Hence, the exhaust gases formed during incineration in second compartment 9 with their content of combustible constituents will be directed into the calciner 3 in which its content of combustible constituents are burned out and thus utilized for calcination of the cement raw meal.

The retention time of the waste in second compartment 9 can be simply controlled by regulating the rotational speed of the rotary disc. Furthermore, the disc is adaptable to be rotated at a higher speed during a short period of time, followed by a prolonged break, since this will result in better scraper performance than is attainable during constant low-speed operation. Another option involves intermittent high-speed operation in forward direction, separated by intermittent periods of backward operation over smaller distances. The different modes of operation make it possible to vary the retention time of the waste in order to ensure complete combustion of the designated waste material.

In event of risks of overheating and/or explosion in the second combustion compartment 9, cold raw meal from a raw meal store 17 or a specifically provided emergency bin can be conducted to the compartment 9. The cold raw meal will preferably be supplied in sufficient quantity to ensure cooling of the waste and to shield it from the hot gases from the kiln 5.

Exhaust gases from the compartment 9 enter the calciner 3 of the system. Exhaust gases from the kiln may enter the calciner from a different location, such as at point 72. It is preferred that these gases enter into the bottom of the vessel. Additional fuel for the calciner may be provided, such as at point 44, may be provided for insertion in the gas stream from the kiln. Meal may be diverted to location 54 for temperature control between the inlet of the fuel and the entry of exhaust gases from compartment 9. The meal may be cold, but it is preferred that the raw meal be hot meal that has past through at least one cyclone in the preheater tower, and it is most preferred that it come from the second or third cyclone stage from the bottom of the preheater.

The exhaust gases from compartment 9 entering the calciner 3 will contain any excess oxygen from combustion processes that have occurred in combustion chamber 10 and compartment 9, as well as raw meal and uncombusted particles of fuel from the fuel entry locations 41, 42, and 43. Calciner 3 provides sufficient residence time for the completion of combustion for the fuel entering the system from these locations and fuel entry point 44. Optionally, additional oxygen may be provided directly to the calciner 3 through an air or oxygen inlet 72 that may be at ambient temperature or may be preheated prior to entry, a portion of which may come from conduit 15. Raw meal is added to the calciner at point 55 for the purpose of calcining the material to remove carbon dioxide. The meal may be cold, but it is preferred that the raw meal be hot meal that has past through at least one cyclone in the preheater tower, and it is most preferred that it come from the second or third cyclone stage from the bottom of the preheater.

Large ash and slag from combustion in the combustion chamber 10 and compartment 9 are dropped into the calciner 3 from compartment 9. Large particles which are not entrained in the gas stream will fall in direction 81 by force of gravity to the kiln inlet or a collection area. Calcined meal and exhaust gases exit the calciner via conduit 82. The calcined meal is collected in a cyclone and fed to the kiln for clinkering.

The above described embodiments are set forth by way of example and are not for the purpose of limiting the present invention. It will be readily apparent to those skilled in the art that obvious modifications, derivations and variations can be made to the embodiments without departing from the scope of the invention. Accordingly, the claims appended hereto should be read in their full scope including any such modifications, derivations and variations.

What is claimed is:

1. A system for the production of mineral combustion products such as cement clinker out of raw meal having a raw meal preheater system with a raw meal calciner, a rotary kiln and a clinker cooler, with the calciner being positioned to receive hot exhaust gases from the kiln, an improvement comprising
a vertically situated first combustion chamber having input for combustible solid waste fuels and waste gases, said first combustion chamber being a down draft chamber in which there is a downward flow of combustion gas and solid waste fuel to a waste and gas outlet;
and a second combustion chamber for solid waste fuels having an inlet flow connected to the outlet of the first combustion chamber and an outlet flow connected to the calciner, said second chamber being adaptable to support solid waste on a supporting surface incorporated in the compartment and further being adaptable to also receive waste fuel for incineration from a source other than the first combustion chamber and to provide a longer solid waste residence time than the first combustion chamber, said second chamber having means to transport any uncombusted solid waste therein along a circular path of a rotating rotary disc to its outlet and then to the calciner while simultaneously subjecting said waste to incineration.

2. The system of claim 1 further comprising means to vent hot exhaust gases produced in connection with the incineration of the waste from the second combustion chamber to the preheater system for heating the cement raw meal.

3. The system of claim 1 wherein the second chamber is adapted to have a waste residence time that is at least ninety times the waste residence time in the first combustion chamber.

4. The system of claim 3 wherein the second chamber is adapted to have a waste residence time that is at least one thousand times the waste residence time in the first combustion chamber.

5. The system of claim 1 further comprising means to inject combustion air tangentially into the first combustion chamber.

6. The system of claim 1 further comprising means to inject waste fuel axially into the first combustion chamber.

7. A method for incinerating combustible solid waste during the manufacture of cement clinker comprising:
- preheating cement raw material in a preheater system having a calciner;
- burning the preheated cement raw material to form clinker in a kiln in combustion gas, with the calciner being positioned to receive hot exhaust gases from the kiln;
- cooling the burned clinker in a clinker cooler;
- introducing solid waste fuel to a waste inlet of a vertically situated first combustion chamber for solid waste for at least partial combustion therein, said first combustion chamber being a down draft chamber in which there is a downward flow of combustion gas and waste fuel to a waste and gas outlet;
- passing the gas and any at least partially unburned solid waste from the first combustion chamber to a second combustion chamber for solid waste through a inlet in the second combustion chamber in communication with the waste outlet of the first combustion chamber, said second combustion chamber having a solid waste outlet in communication with the calciner and being adaptable to support solid waste on a supporting surface incorporated in the chamber and further being adaptable to also receive waste fuel for incineration from a source other than the first combustion chamber; and
- transporting any solid waste in the second combustion chamber through the compartment to the waste outlet along a circular path of a rotating rotary disc while simultaneously subjecting said solid waste to incineration.

8. The method according to claim 7, further comprising venting hot exhaust gases produced in connection with the incineration of the waste from the second combustion chamber to the preheater system for heating the cement raw meal.

9. The method according to claim 7, further comprising introducing waste fuel for incineration to the second combustion chamber from a source other than the first combustion chamber.

10. The method according to claim 9, further comprising combusting a different type of waste fuel in the second combustion chamber than is combusted in the first combustion chamber.

11. The method according to claim 7, wherein preheated cement raw meal is introduced to at least one of the first combustion chamber or the second combustion chamber.

12. The method according to claim 7, wherein cold cement raw meal is introduced to the second combustion chamber.

13. The method according to claim 7, wherein the waste fuel is retained within the first combustion chamber for from about 1 to about 10 seconds.

14. The method according to claim 7, wherein waste fuel is retained within the second combustion chamber for at least about five minutes.

15. The method according to claim 14, wherein waste fuel is retained within the second combustion chamber for at least about one hour.

16. The method according to claim 7, further comprising introducing hot combustion gas from the clinker cooler to the first combustion chamber.

17. The method according claim 7, further comprising feeding exhaust gases generated during the waste incineration process to the calciner of the preheater for calcination of the cement raw meal.

18. A method for incinerating combustible solid waste during the manufacture of cement clinker comprising:
- preheating cement raw material in a preheater system having a calciner;
- burning the preheated cement raw material to form clinker;
- cooling the clinker in a subsequent clinker cooler;
- introducing solid waste fuel for combustion in a gas to a first combustion chamber;
- passing the gas and any unburned solid waste from the first combustion chamber to a second combustion chamber in which the unburned solid waste is further burned; and
- venting hot exhaust gases produced in connection with the incineration of the solid waste to the preheater system for heating the cement raw meal, wherein the solid waste fuel retention time in the second combustion chamber is at least ninety times the solid waste fuel retention time in the first combustion chamber.

* * * * *